United States Patent
Alameh et al.

(10) Patent No.: US 11,061,481 B2
(45) Date of Patent: *Jul. 13, 2021

(54) ELECTRONIC DEVICE WITH GESTURE DETECTION SYSTEM AND METHODS FOR USING THE GESTURE DETECTION SYSTEM

(71) Applicant: Google Technology Holdings LLC, Mountain View, CA (US)

(72) Inventors: Rachid Mohsen Alameh, Crystal Lake, IL (US); Patrick J. Cauwels, South Beloit, IL (US); Kenneth A. Paitl, West Dundee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,422

(22) Filed: Mar. 30, 2020

(65) Prior Publication Data

US 2020/0225762 A1 Jul. 16, 2020

Related U.S. Application Data

(63) Continuation of application No. 16/055,637, filed on Aug. 6, 2018, now Pat. No. 10,606,365, which is a
(Continued)

(51) Int. Cl.
*G09G 5/00* (2006.01)
*G06F 3/01* (2006.01)
(Continued)

(52) U.S. Cl.
CPC ............ *G06F 3/017* (2013.01); *G06F 1/1684* (2013.01); *G06F 1/3231* (2013.01); *G06F 3/011* (2013.01);
(Continued)

(58) Field of Classification Search
CPC ........ G06F 3/017; G06F 3/012; G06F 3/0325; G06F 1/1684; G06F 1/3231; G06F 3/011;
(Continued)

(56) References Cited

U.S. PATENT DOCUMENTS 6,266,061 B1 * 7/2001 Doi ........................ G06F 3/017
345/156
7,522,344 B1 4/2009 Curatu et al.
(Continued)

FOREIGN PATENT DOCUMENTS

| CN | 202795231 | 3/2013 |
|---|---|---|
| GB | 2408325 | 5/2005 |

(Continued)

OTHER PUBLICATIONS

International Search Report and Written Opinion of the International Search Authority dated Oct. 31, 2014 in International Patent Application No. PCT/US2014/054988.
(Continued)

*Primary Examiner* — Kiho Kim
(74) *Attorney, Agent, or Firm* — Byrne Poh LLP

(57) ABSTRACT

A method in an electronic device, the method includes projecting infrared ("IR") light from a plurality of light emitting diodes ("LEDs") disposed proximate to the perimeter of the electronic device, detecting, by a sensor, IR light originating from at least two of the plurality of LEDs reflected from off of a person, and carrying out a function based on the relative strength of the detected IR light from the LEDs.

21 Claims, 13 Drawing Sheets

Related U.S. Application Data continuation of application No. 15/243,696, filed on Aug. 22, 2016, now Pat. No. 10,042,429, which is a continuation of application No. 14/707,991, filed on May 8, 2015, now Pat. No. 9,423,500, which is a continuation of application No. 14/098,884, filed on Dec. 6, 2013, now Pat. No. 9,029,780.

(60) Provisional application No. 61/876,691, filed on Sep. 11, 2013.

(51) Int. Cl.

| | | |
|---|---|---|
| *G06F 1/16* | (2006.01) | |
| *G06F 1/3231* | (2019.01) | |
| *G06F 3/041* | (2006.01) | |
| *G06F 3/042* | (2006.01) | |
| *H04M 1/72448* | (2021.01) | |
| *G06F 3/03* | (2006.01) | |
| *H04M 1/02* | (2006.01) | |

(52) U.S. Cl.
CPC ............ *G06F 3/012* (2013.01); *G06F 3/0325* (2013.01); *G06F 3/0416* (2013.01); *G06F 3/0421* (2013.01); *H04M 1/72448* (2021.01); *G06F 2203/04108* (2013.01); *H04M 1/026* (2013.01); *H04M 2250/12* (2013.01); *Y02D 10/00* (2018.01)

(58) Field of Classification Search
CPC ................. G06F 3/0416; G06F 3/0421; G06F 2203/04108; H04M 1/72563; H04M 1/026; H04M 2250/12; Y02D 10/00
See application file for complete search history.

(56) References Cited

U.S. PATENT DOCUMENTS

| | | |
|---|---|---|
| 8,160,311 B1 | 4/2012 | Schaefer |
| 9,196,239 B1 | 11/2015 | Taylor et al. |
| 9,341,843 B2 | 5/2016 | Border et al. |
| 9,965,038 B2 | 5/2018 | Walline et al. |
| 2003/0132974 A1 | 7/2003 | Bodin |
| 2005/0250562 A1 | 11/2005 | Caroll |
| 2011/0179368 A1 | 7/2011 | King et al. |
| 2011/0248152 A1 | 10/2011 | Svajda et al. |
| 2011/0310005 A1 | 12/2011 | Chen et al. |
| 2012/0194511 A1 | 8/2012 | Cho |
| 2012/0206414 A1 | 8/2012 | Tada et al. |
| 2012/0262365 A1 | 10/2012 | Mallinson |
| 2012/0312956 A1 | 12/2012 | Chang et al. |
| 2012/0313891 A1 | 12/2012 | Chang et al. |
| 2013/0069865 A1 | 3/2013 | Hart et al. |
| 2013/0257709 A1 | 10/2013 | Raffle et al. |
| 2013/0265248 A1 | 10/2013 | Nagahara et al. |
| 2013/0303281 A1 | 11/2013 | Argiro |
| 2013/0321271 A1 | 12/2013 | Bychkov et al. |
| 2014/0031668 A1 | 1/2014 | Mobasser et al. |
| 2015/0035440 A1 | 2/2015 | Spero |
| 2018/0067557 A1 | 3/2018 | Robert et al. |

FOREIGN PATENT DOCUMENTS

| | | |
|---|---|---|
| JP | 2012079330 | 4/2012 |
| WO | WO 2012070161 | 5/2010 |

OTHER PUBLICATIONS

Notice of Allowance dated Jan. 13, 2015 in U.S. Appl. No. 14/098,884.
Notice of Allowance dated Jan. 17, 2018 in U.S. Appl. No. 15/243,696.
Notice of Allowance dated Apr. 25, 2016 in U.S. Appl. No. 14/707,991.
Notice of Allowance dated Nov. 20, 2019 in U.S. Appl. No. 16/055,637.
Office Action dated Jan. 6, 2016 in U.S. Appl. No. 14/707,991.
Office Action dated Apr. 3, 2017 in U.S. Appl. No. 15/243,696.
Office Action dated Jul. 19, 2017 in U.S. Appl. No. 15/243,696.
Office Action dated Aug. 2, 2019 in U.S. Appl. No. 16/055,637.
Office Action dated Oct. 28, 2014 in U.S. Appl. No. 14/098,884.
Office Action dated Nov. 6, 2017 in U.S. Appl. No. 15/243,696.
Starner, T., et al., "The Gesture Pendant: A Self-illuminating, Wearable, Infrared Computer Vision System for Home Automation Control and Medical Monitoring", In Proceedings of the IEEE 4th International Symposium on Wearable Computers, Atlanta, GA, US, Oct. 16-17, 2000, pp. 87-94.

\* cited by examiner

400

1100

ELECTRONIC DEVICE WITH GESTURE DETECTION SYSTEM AND METHODS FOR USING THE GESTURE DETECTION SYSTEM

CROSS-REFERENCE TO RELATED TO APPLICATIONS

This application is a continuation of U.S. patent application Ser. No. 16/055,637, filed Aug. 6, 2018, which is a continuation of U.S. patent application Ser. No. 15/243,696, filed Aug. 22, 2016, which is a continuation of U.S. patent application Ser. No. 14/707,991, filed May 8, 2015, which is a continuation of U.S. patent application Ser. No. 14/098,884, filed Dec. 6, 2013, which claims the benefit of U.S. Provisional Application No. 61/876,691, filed Sep. 11, 2013, each of which is hereby incorporated by reference herein in its entirety.

TECHNICAL FIELD

The present disclosure relates to electronic devices having gesture detection systems and, more particularly, to electronic devices with infrared light emitting diode gesture detection system and methods for using the gesture detection system.

BACKGROUND

Mobile devices such as cellular telephones, smart phones, and other handheld or portable electronic devices such as personal digital assistants ("PDAs"), headsets, MP3 players, etc. have become popular and ubiquitous. As more and more features have been added to mobile devices, there has been an increasing desire to equip these mobile devices with input/output mechanisms that accommodate numerous user commands and/or react to numerous user behaviors. It is of increasing interest that mobile devices be capable of detecting the presence of, and determining with some accuracy the position of, physical objects located outside of the mobile devices and, more particularly, the presence and location of human beings (or portions of their bodies, such as their heads or hands) who are using the mobile devices or otherwise are located nearby the mobile devices. By virtue of such capabilities, the mobile devices are able to adjust their behavior in a variety of manners that are appropriate given the presence (or absence) and location of the human beings and/or other physical objects.

While remote sensing devices such as infrared (or, more accurately, near-infrared) transceivers have been employed in the past in some mobile devices to allow for the detection of the presence and/or location of human beings and/or physical objects even when not in physical contact with the mobile devices, such sensing devices have been limited in various respects. In particular, some such near-infrared transceivers in some such mobile devices are only able to detect the presence or absence of a human being/physical object within a certain distance from the given transceiver (e.g., binarily detect that the human being/physical object is within a predetermined distance or proximity to the transceiver), but not able to detect the three-dimensional location of the human being/physical object in three-dimensional space relative to the transceiver. Also, some such transceivers in some such mobile devices are undesirably complicated or require large numbers of components in order to operate, which in turn renders such devices unduly expensive. Many such implementations are modular in type and thus require user to have prior knowledge of the module location in order to operate above the module, resulting in a less than optimum experience. Further, those systems are focused on a specific implementation of gesturing and not designed to be used as part of other systems such as side approach detection, eye tracking, facial illumination, and data transmissions.

DRAWINGS

While the appended claims set forth the features of the present techniques with particularity, these techniques may be best understood from the following detailed description taken in conjunction with the accompanying drawings of which:

DESCRIPTION

Figure 1:
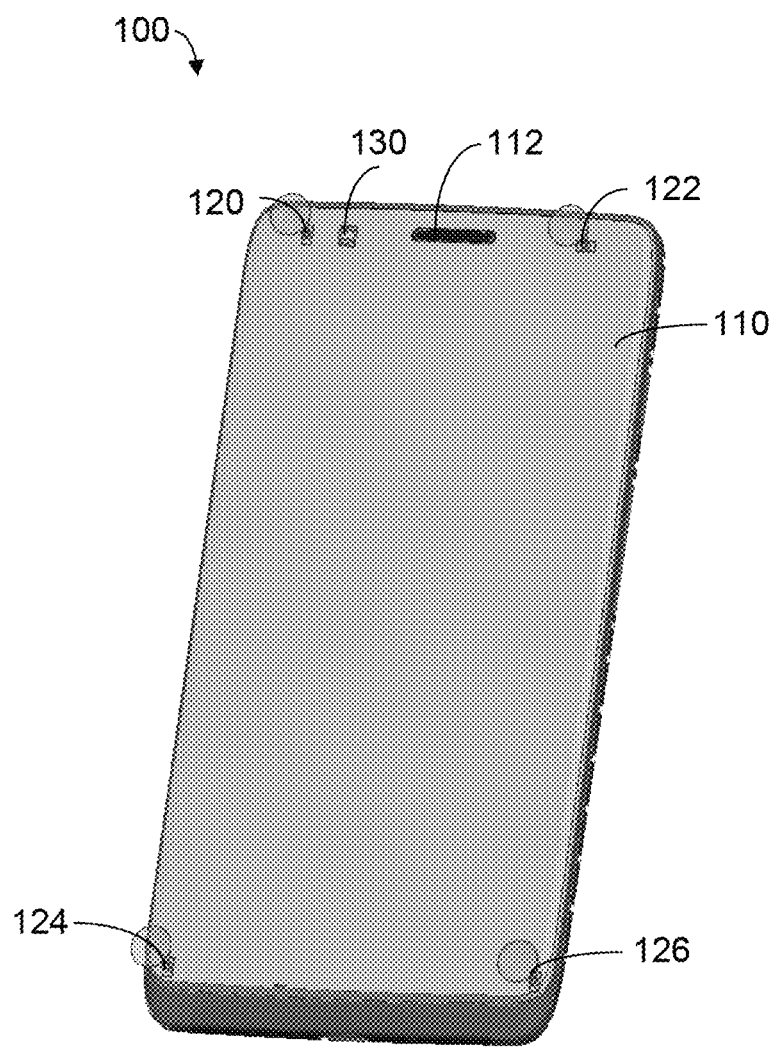
FIG. 1 is a perspective view of an electronic device, which is depicted as a mobile device in the drawing.

The present disclosure sets forth an electronic device with an infrared ("IR") light emitting diode ("LED") gesture detection system and methods for using the gesture detection system. Various embodiments of the distributed IR LED gesture detection system offer users a better experience because the gesture detection system is designed to mimic and/or exceed touch screen coverage area but is not in contact with the cover glass. Another benefit for this distributed IR LED detection system is the ability to enhance hand approach detection, where the device may detect a user's hand approaching from any side of the device. The enhanced hand approach detection may be used to wake up device. In addition, the IR LED gesture detection system is not only capable of detecting gestures, but also supports other functionalities. As discussed in more detail below, the IR LED gesture detection system may also support hand approach detection, eye movement tracking, facial illumination, and IR proximity functionality to disable a touch screen of the device during phone calls. Accordingly, the IR LED gesture detection system provides the benefit of additional applications and functionalities to a device employing such gesture detection system.

In an embodiment, an electronic device includes LEDs disposed proximate to the perimeter of the device and a sensor disposed in the device. The LEDs project IR light. The sensor detects IR light originating from at least one of the LEDs reflected from off of a person. Based on the relative strength of the detected IR light, the device carries out a function based on the detected IR light from two selected LEDs. The device may detect a gesture using at least two of the LEDs (i.e., the active LEDs).

The device may identify, based on the relative strength of the detected IR light, at least one LED having much weaker detected IR light. The device may ignore that LED or LEDs. In another embodiment, the device may ignore at least one LED whose projected IR light is not detected by the sensor (e.g., due to blockage by a person's hand).

In another embodiment, if the detected IR light originating from one LEDs becomes weaker than the detected IR light of at least one of the remaining LEDs, the device may reselect at least two other LEDs. After reselection, the device may carry out a function based on detected IR light from the two reselected LEDs. The two reselected LEDs may include the other of the two selected LEDs having the stronger detected IR light. This embodiment is directed to using subgroups of the plurality of LEDs, and dynamically switching between the LED subgroups, to detect gestures.

In a further embodiment, the device illuminates the person's face with one or more LEDs for more diffused type or broad illumination (i.e., a facial illumination function). The LED (or LEDs) projects IR light onto the person's face, and the sensor receives IR light reflected off of the person's face. Based on a characteristic of the received IR light, the device determines the uniformity of the facial illumination. Based on the determined uniformity, the device may increase or decrease the projection of the LED (or LEDs).

The characteristic of the received IR light may include the relative strength of the received IR light. Based on the relative strength of the received IR light, the device may further determine a difference between the received IR light from the LED having the stronger reflected IR light and the LED having the weaker reflected IR light. Based on the determined difference, the device may increase the IR light projection of the LED having the weaker reflected IR light. This embodiment is directed to an IR transceiver (LED and sensor) closed loop system, which may be used to enhance the facial illumination function. The IR transceiver closed loop system adaptively adjusts the LEDs' IR light projections and coverage based on the received IR light signal to provide a more uniform illumination of a person's face.

In yet another embodiment, an electronic device includes LEDs disposed proximate to the perimeter of the device and a sensor disposed in the device. The LEDs project IR light. The sensor detects IR light originating from at least one of the LEDs reflected from off of a person. Based on the detected IR light, the device detects the presence of the person. If the presence of the person is detected, the device carries out a function.

In an embodiment, the LEDs sequentially project IR light. If the presence of the person is detected, the device may turn on a screen, wake up the electronic device, display the time, initiate a notification, change a user interface, or reduce power consumption. The sensor detects IR light originating from at least two of the LEDs reflected from off of the person and use the reflected light to detect a gesture.

In another embodiment, the LEDs simultaneously project IR light to detect a person from a longer range.

In an embodiment, the electronic device includes a first group of LEDs that are proximate to the perimeter of the device, a second group of LEDs proximate to the perimeter of the device, and a sensor in the device. The first group of LEDs and the second group of LEDs project IR light. The sensor then detects IR light reflected off of a person. The device then generates signals based on the detected IR light. If the detected IR light originates from any of the LEDs of the first group, the device processes the signals as a single, first LED. If the detected IR light originates from any of the LEDs of the second group, the device processes the signals as a single, second LED. Based on whether the signals are processed as the first LED or the second LED, the device determines whether the person is making a first gesture or a second gesture.

In another embodiment, an electronic device first detects its orientation. Based on the detected orientation, the device activates two of the LEDs or a subgroup of the LEDs (the subgroup may have two or more LEDs), which are disposed proximate to the perimeter of the device. A sensor disposed in the device detects reflected IR light originating from at least one of the two activated LEDs. Based on the detected IR light, the device carries out a function.

If the orientation of the device is detected to be a portrait mode, the device activates a first set of two LEDs. If the orientation of the device is detected to be a landscape mode, the device then activates a second set of two LED.

If the orientation of the electronic device is detected to be a portrait mode, both LEDs in the first set of two LEDs may simultaneously project IR light. If the orientation of the electronic device is detected to be a landscape mode, both LEDs in the second set of two LEDs may simultaneously project IR light.

In still another embodiment, an electronic device includes a first LED disposed proximate to the perimeter of the device, a second LED disposed proximate to the perimeter of the device, and a sensor disposed closer to the first LED than the second LED. The first LED projects IR light, and the second LED projects IR light. The sensor detects reflected IR light from off of a person from both LEDs. The first LED (disposed closer to the sensor) allows detection down to glass (e.g., detect a person touching the glass). The second LED (disposed further to the sensor) is expected to cover a range before the person touches the glass. Based on the detected IR light, the device carries out a voting function and determines whether to deactivate a touch screen of the device based on the results of the voting function.

To determine whether to deactivate the touch screen, if the detected IR light originates from the second LED, the device may detect that the person is approaching the device. If the detected IR light originates from the first LED, the device may deactivate the touch screen. In an embodiment, the second LED may have a longer range than the first LED.

In a further embodiment, an electronic device includes a first LED disposed proximate to the perimeter of the electronic device, a second LED disposed proximate to the perimeter of the device, and a camera. The first LED projects IR light onto a person's eye, and the second LED projects IR light onto the person's eye. The camera captures IR light spots from the first LED and the second LED on the person's eye. The device then tracks the captured IR light spots to detect movement of the eye.

The device may include at least four LEDs disposed proximate to the perimeter of the device. Then device may determine which group of two LEDs is the most appropriate for tracking movement of the eye. The device may identify an LED that is weaker than the remaining LEDs. The device may then energize the identified LED via the IR transceiver (LED and sensor) closed loop system described above with respect to the facial illumination function.

The device may further determine a characteristic of the captured IR light spots. The characteristic of the captured IR light spot may include the strength of the captured IR light spots to determine the location of the person's head relative to the device. The characteristic may also include the angle at which the captured IR light spots are received. The characteristic may further include the direction from which the captured IR light spots are received.

FIG. 1 is a perspective view of an electronic device 100 (also referred to as "device 100" or "device") according to an embodiment, which is depicted as a mobile device in the drawing. The electronic device 100 includes a housing 110, LEDs disposed proximate to the perimeter of the housing, and a sensor 130. The housing 110 includes a cover glass and an opening 112 formed therein, and a speaker is disposed in the housing below the opening 112. In the embodiment shown, the LEDs include a first LED 120, a second LED 122, a third LED 124, and a fourth LED 126. As shown in FIG. 1, the first LED 120, the second LED 122, the third LED 124, and the fourth LED 126 are disposed proximate to the four corners of the housing 110, respectively.

Although FIG. 1 illustrates the housing 110 as having a substantially rectangular shape including sides and rounded corners, in other embodiments, the housing 110 may have another shape without sides and/or corners. Furthermore, while FIG. 1 shows four LEDs located proximate to the corners of the electronic device 100, in other embodiments, the LEDs may be disposed proximate to other areas of the perimeter of the device 100, instead of the corners of the device 100.

Each of the LEDs projects or emits IR light having a wavelength that typically ranges from about 850 nanometers to about 1 micrometer for infrared. The LEDs could project light having a wavelength that ranges lower into the visible region as well, e.g., down toward 400 nm range. The sensor 130, which is an IR light sensor or receiver, detects IR light from the LEDs.

In one embodiment, the LEDs are of the same color. The LEDs may project or emit IR light sequentially, or the LEDs may project or emit light following a pulse or wave-shaped pattern. In another embodiment, the LEDs are of different colors, and may project or emit light simultaneously.

In the embodiment shown in FIG. 1, The LEDs are equipped with microfilm beam bending lenses to direct the IR light beams projected by the LEDs in certain directions. The sensor 130 is disposed proximate to the opening 112 (i.e., proximate to the speaker). The sensor 130 is also be disposed closer to the first LED 120 than to the remaining three LEDs to perform an IR proximity function, which will be described in detail below.

Figure 2:
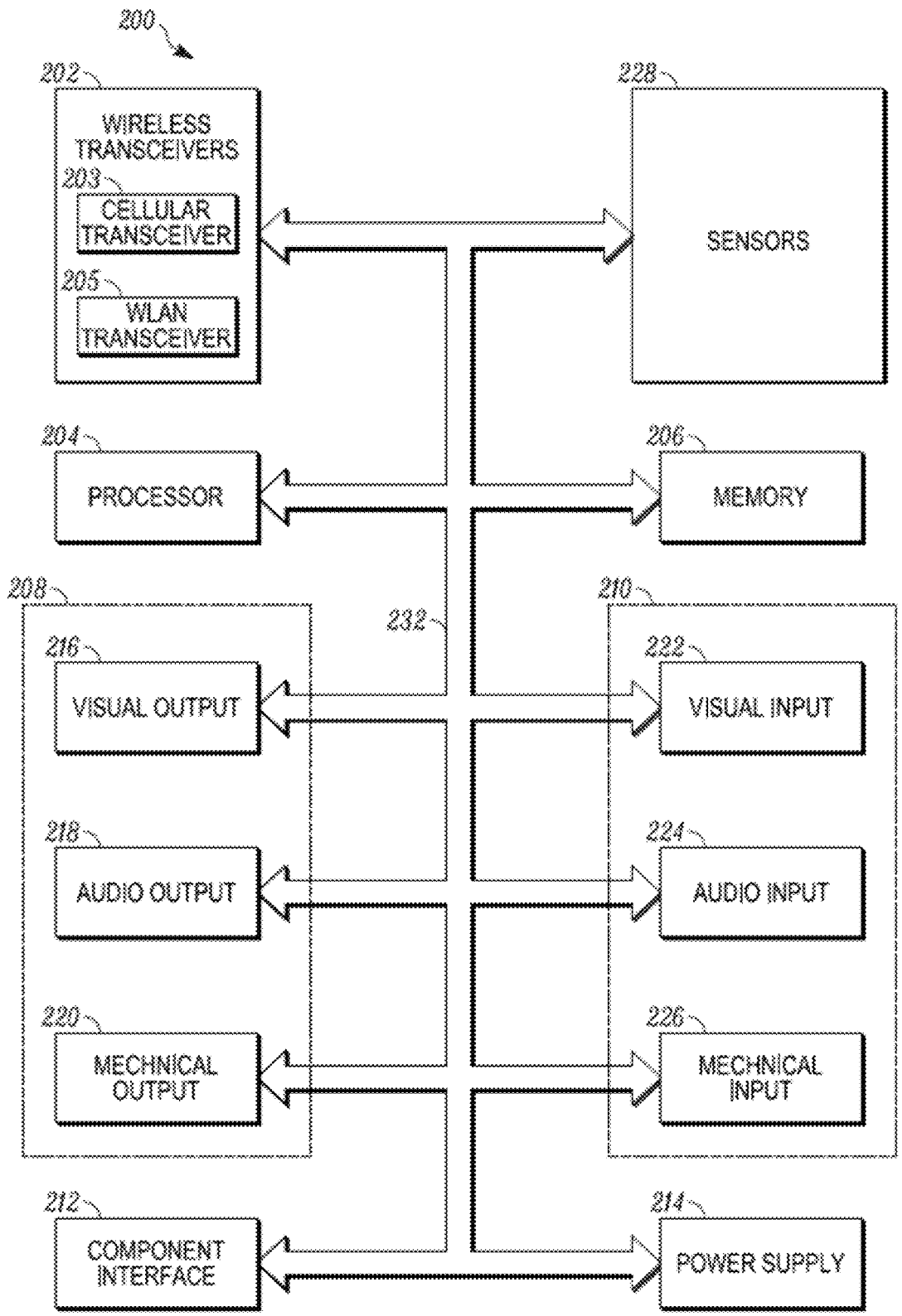
FIG. 2 shows example components of the electronic device of FIG. 1.

FIG. 2 shows internal components of the device 100 of FIG. 1, in accordance with an embodiment of the disclosure. As shown in FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or additionally) conduct other types of communications commonly understood as being encompassed within Wi-Fi communications, such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the embodiment shown in FIG. 1, the device 100 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 100 is capable of communicating with any of a variety of other devices or systems (not shown) including, for example, other mobile devices, web servers, cell towers, access points, other remote devices, etc. Depending upon the embodiment or circumstance, wireless communication between the device 100 and any arbitrary number of other devices or systems can be achieved.

Operation of the wireless transceivers 202 in conjunction with others of the internal components 200 of the device 100 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 100. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, if the device 100 includes a touch screen display, the touch screen display can be considered to constitute both a visual output device and a mechanical input device.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 100 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 100, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 100 to perform a process such as the process for gesture recognition and discussed further below. Finally, with respect to informational data, this is non-executable code or information that can be referenced and/or manipulated by an operating system or program for performing functions of the device 100.

Referring to FIG. 1, the first LED 120, the second LED 122, the third LED 124, the fourth LED 126, and the sensor 130 together form an IR gesture detection system. In an embodiment, each of the plurality of LEDs projects IR light, and the sensor 130 detects IR light reflected by a person or an object. Based on the reflected IR light, the device 100 selects at least two of the LEDs to detect gesture. In one embodiment, the device 100 selects two LEDs (e.g., the first LED 120 and the second LED 122) to detect a two-dimensional ("2D") gesture. In another embodiment, the device 100 selects three LEDs (e.g., the first LED 120, the second LED 122, and the third LED 124) to detect a three-dimensional ("3D") gesture.

In one embodiment, the device 100 requires no more than three LEDs to detect gestures. Thus, if the reflected IR light from one of the plurality of LEDs is weaker than the remaining LEDs (e.g., the first LED 120 is blocked by a person's hand), the device 100 may select two or three of the remaining LEDs for gesture detection (e.g., the second LED 122, the third LED 124, and the fourth LED 126). In other words, the device 100 may ignore the LED having the weakest reflected IR light. Based on the reflected IR light received by the sensor 130, the device 100 may thus adaptively select the LEDs to be used for gesture detection as the person uses or grabs the device 100.

In yet another embodiment, the device 100 may detect a person approaching the device 100, e.g., the presence of the person near the device 100. In this embodiment, the plurality of LEDS project IR light. The sensor 130 detects IR light originating from at least one of the plurality of LEDs (e.g., the first LED 120) reflected from off of the person. Based on the detected IR light from LED or LEDs, the device 100 detects whether the person is present and where the person is located with respect to the device 100 (e.g., direction and distance of the person with respect to the device 100). If the presence of the person is detected, the device 100 may carry out a function, e.g., turning on a screen, waking up the electronic device, displaying the time, initiating a notification, changing a user interface, and reducing power consumption.

In this embodiment, the plurality of LEDs project IR light pulses sequentially or serially. By cycling through the plurality of LEDs, the sensor 130 may detect any disturbance (e.g., a person's hand reflecting IR light projected by at least one of the LEDs) to indicate the person's hand approach. In response to the person's hand approach, the device 100 may turn on its display, initiate notification, or alert the person of messages.

In another embodiment, the plurality of LEDs or subset of them may project IR light simultaneously. This configuration increases the range or coverage of the plurality of LEDs and thus enhances hand approach detection.

In still another embodiment, the device 100 may cycle the plurality of LEDs for person or object detection, perform gesture detection, and enhanced hand approach detection. First, the plurality of LEDs projects IR light pulses serially, and the sensor 130 detects reflected IR light from any LED to detect a person or object. If the sensor 130 detects reflected IR light from only one LEDs or any combination of LEDs, the sensor 130 detects the presence of the person or object. Then, the plurality of LEDs project IR light pulses serially to detect gestures, and the sensor 130 detects reflected IR light from at least two of the LEDs. Next, some of the plurality of LEDs transmits IR light pulses simultaneously for enhanced hand approach detection. The LEDs are then turned off for a preset period of time (e.g., 20 milliseconds). The cycle may then be repeated. In this embodiment, the duration of the projected IR pulses is about 10 microseconds. In other embodiments, however, the duration of the projected IR pulses may vary.

Figure 3A:
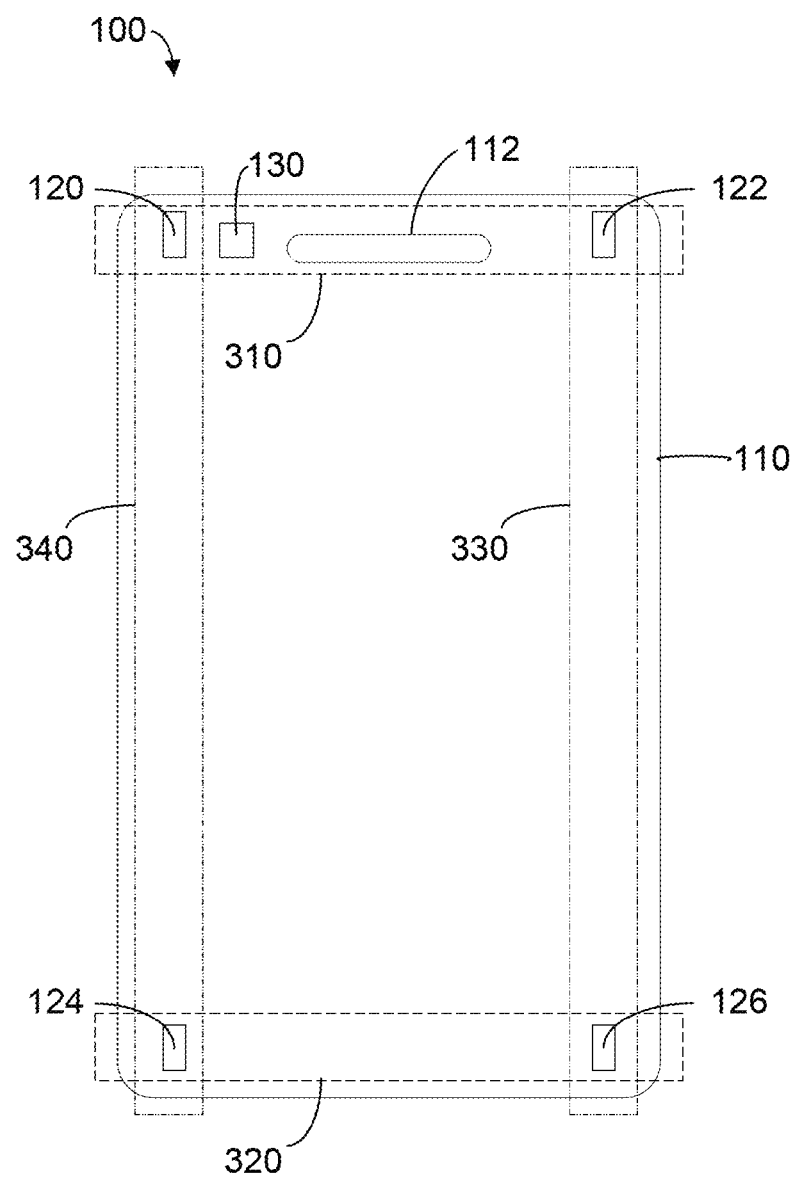
FIG. 3A is a top view of the electronic device of FIG. 1.

FIG. 3A is a top view of the electronic device of FIG. 1. In an embodiment, the device 100 includes an accelerometer to detect an orientation of the device 100. Based on the orientation of the device 100, i.e., portrait mode or landscape mode, the plurality of LEDs may be grouped into two or more independent gesture detection systems.

As shown in FIG. 3A, the device 100 is in portrait mode. If the detected orientation of the device 100 is portrait mode, the first LED 120 and the second LED 122 may form into a first group 310, and the third LED 124 and the fourth LED 126 may form into a second group 320. Each of the first group 310 and the second group 320 functions as an independent 2D gesture detection system. If a person conducts a 2D gesture (e.g., swiping motion from left to right without moving toward or away from the device 100) near the top portion of the device 100, the first group 310 will detect the gesture. If the person conducts a 2D gesture near the bottom portion of the device 100, the second group 320 will detect the gesture.

If the detected orientation of the device is landscape mode (e.g., the device 100 shown in FIG. 3A rotated 90° in the clockwise or counterclockwise direction), the second LED 122 and the fourth LED 126 may form into a third group 330, and the first LED 120 and the third LED 124 may form into a fourth group 340. Each of the third group 330 and the fourth group 340 functions as an independent 2D gesture detection system. If a person conducts a 2D gesture near the top portion of the device 100 in landscape mode (e.g., the right portion of the device 100 as shown in FIG. 3A), the third group 330 will detect the gesture. If the person conducts a 2D gesture near the bottom portion of the device 100 in landscape mode (e.g., the left portion of the device 100 as shown in FIG. 3A), the fourth group 340 will detect the gesture.

Figure 3B:
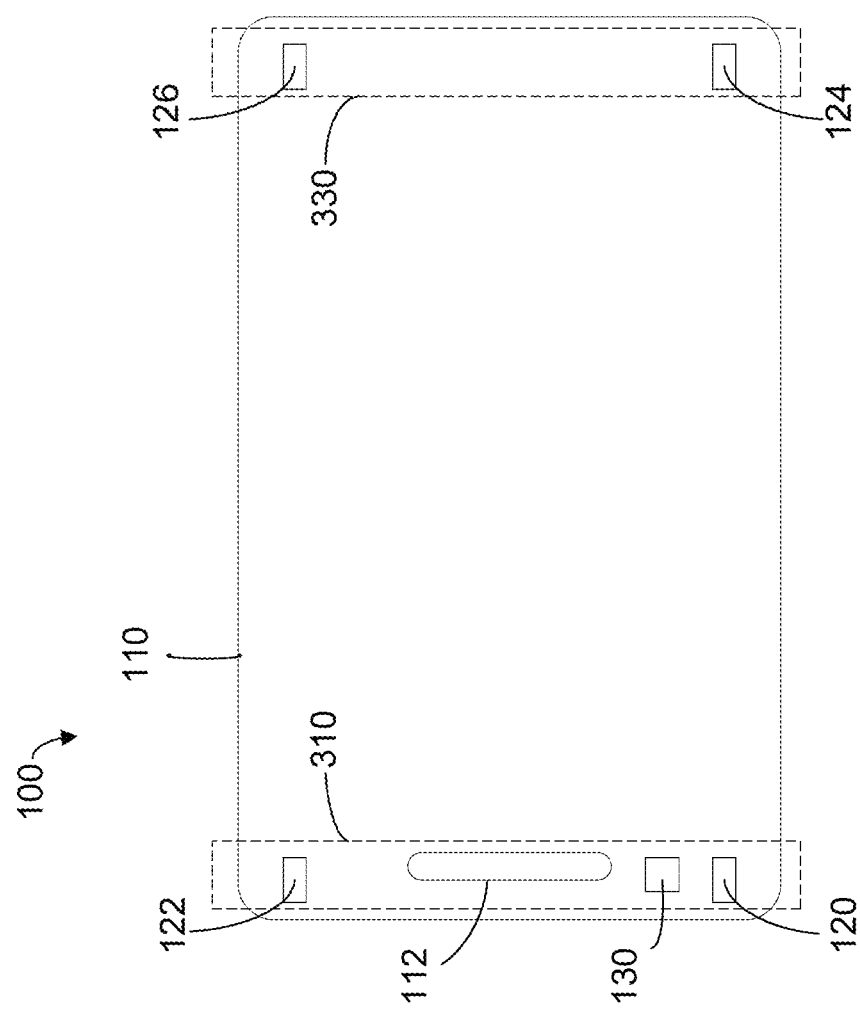
FIG. 3B is another top view of the electronic device of FIG. 1.

FIG. 3B is another top view of the electronic device of FIG. 1, according to an embodiment, in which the detected orientation of the device 100 is landscape mode. The device 100 includes two LED groups; the first group 310 includes the first LED 120 and the second LED 122, and the second group 320 includes the third LED 124 and the fourth LED 126. Unlike the system illustrated in FIG. 3A, the first group 310 and the second group 320 do not function as two independent 2D gesture detection systems. Instead, the two LEDs in each group function as a single LED. In other words, the first LED 120 and the second LED 122 of the first group 310 functions as a single LED; the third LED 124 and the fourth LED 126 of the second group 320 function as another signal LED. Together, the first group 310 and the second group 320 constitute a single 2D gesture detection system. For example, when a person conducts a 2D gesture (e.g., swiping motion from left to right), the person's hand must reflect IR light projected by each of the first group 310 and the second group 320 in order to be detected by the sensor 130.

In an embodiment, although the LEDs projects IR light sequentially, the sensor 130 interprets the signals from the LEDs of the first group together and interprets the signals from the LEDs of the second group together. In another embodiment, the LEDs in each group project IR light simultaneously (e.g., the first LED 120 and the second LED 120 project simultaneously, and the third LED 124 and the fourth LED 126 project simultaneously). In the simultaneously projection embodiment, IR light projected by the LEDs in each group is not distinguished, and light from all of the LEDs is treated as the same light, having double the optical output power.

While FIGS. 3A and 3B illustrate two LEDs in each group, in other embodiments, each group of LEDs includes three LEDs to detect 3D gestures. Furthermore, although FIG. 3B only shows the first group 310 and the second group 320, in other embodiments, the third group 330 and the fourth group 340 (as shown in FIG. 3B) constitute a single 2D gesture detection system.

FIGS. 4-12 show steps that are carried out by the electronic device 100 according to various embodiments.

Figure 4:
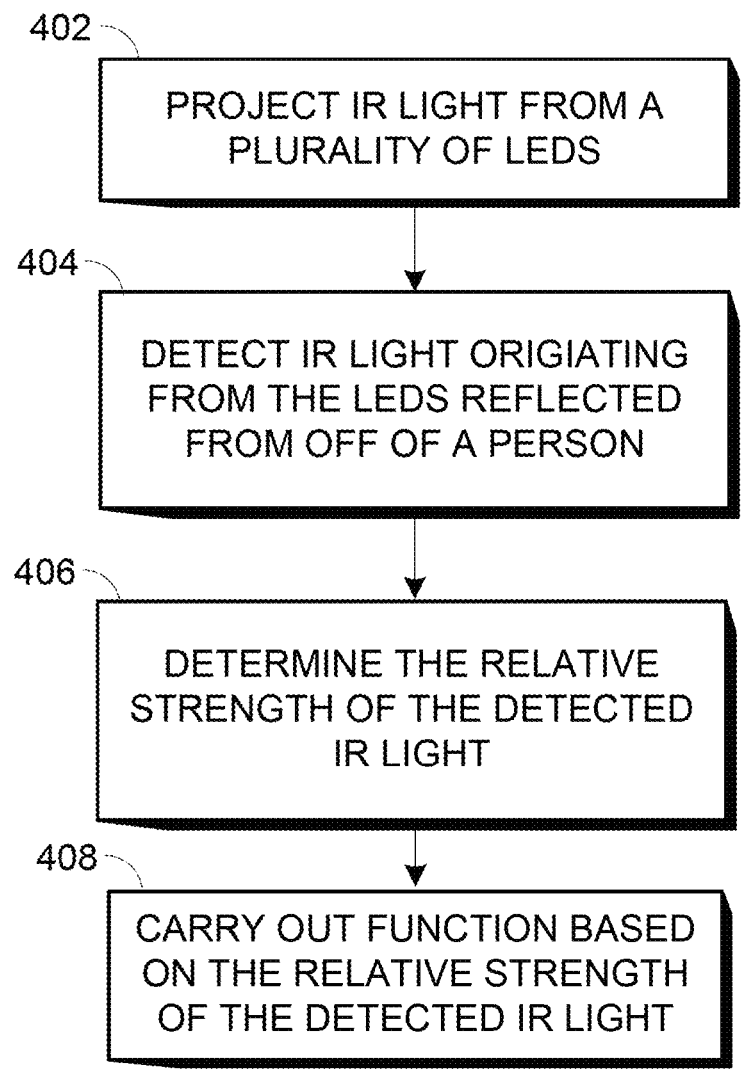
FIGS. 4-12 show steps that may be carried out according to various embodiments.

Referring to FIG. 4, a procedure 400 for gesture detection is carried out by the electronic device 100. At step 402, the electronic device 100 projects IR light from the LEDs (e.g., the first LED 120, the second LED 122, the third LED 124, and the fourth LED 126). At step 404, the sensor 130 of the device 100 detects IR light originating from at least two of the LEDs reflected from off of a person. At step 406, the device 100 determines the relative strength, from among the LEDs, of the detected IR light. Then, at step 408, the device 100 carries out a function based on the determined relative strength of the detected IR light.

In an embodiment, at step 408, the device 100 may detect a gesture using the light from all of the LEDs. In another embodiment, at step 408, the device 100 may ignore the LEDs whose light have not been detected by the sensor 130 (e.g., the LEDs may be blocked by a person's hand). Using the relative strength of the detected IR light, the device 100 may identify the LEDs having the weaker reflected IR light. The weakly received light information may be helpful, as it may serve as an additional data point when the device 100 is performing various functions (e.g., identifying the LEDs having the weaker reflected IR light may allow the device 100 to further determine a location of an object or person with respect to the device). In other embodiments, the device 100 may ignore the LEDs having the weaker reflected IR light.

In yet another embodiment, the device 100 selects three LEDs instead of two LEDs for 3D gesture detection. Then, using the three selected LEDs, the device 100 may detect a 3D gesture.

Figure 5:
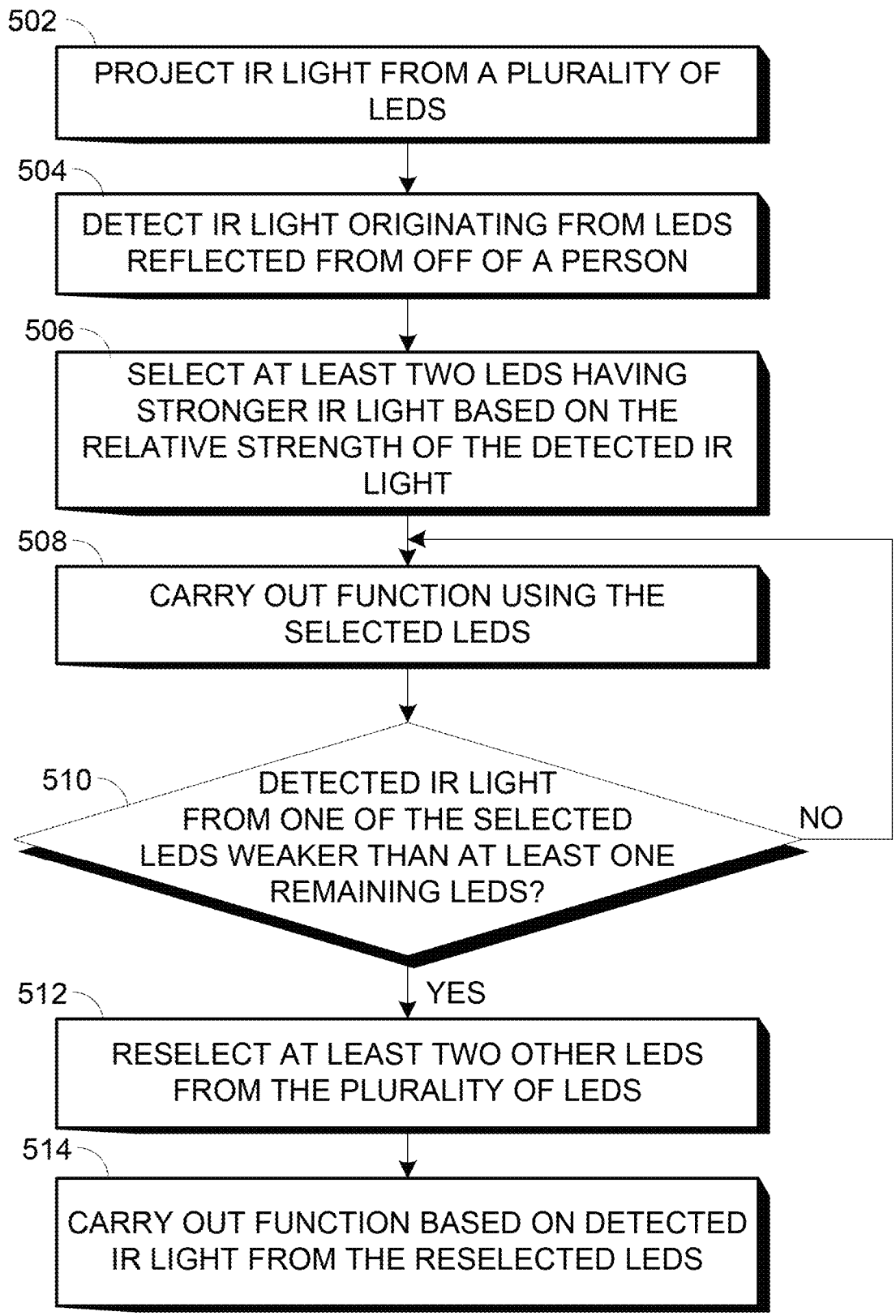

Referring to FIG. 5, a procedure 500 for reselecting IR LEDs is carried out by the electronic device 100. At step 502, the electronic device 100 projects IR light from the LEDs. At step 504, the sensor 130 of the device 100 detects IR light reflected from off of a person. At step 506, the device 100 selects, based on relative strength of the detected IR light, at least two of the LEDs having the stronger reflected IR light. Then, at step 508, the device 100 carries out a function based on the detected IR light from the selected LEDs.

Next, at step 510, the device 100 determines whether the detected IR light originating from one of the selected LEDs has become weaker than the detected IR light of at least one of the remaining LEDs (e.g., whether one of the two selected LEDs is blocked by the person's hand while the person is handling the device 100). If the device 100 determines that the detected IR light originating from one of the selected LEDs has not become weaker than the remaining LEDs (NO of step 510), the procedure returns to step 508 where the device 100 carries out a function based on the detected IR light from the selected LEDs.

If the device 100 determines that the detected IR light originating from one selected LEDs has become weaker than the remaining LEDs (YES of step 510), the device 100 reselects at least two other LEDs at step 512. After reselection, at step 514, the device 100 carries out a function based on detected IR light from the reselected LEDs. The reselected LEDs may include LEDs from the originally selected LEDs having the stronger detected IR light. The device 100 may repeat steps 510 to 514 in order to continually select the LEDs having the stronger reflected light to carry out the function.

Figure 6:
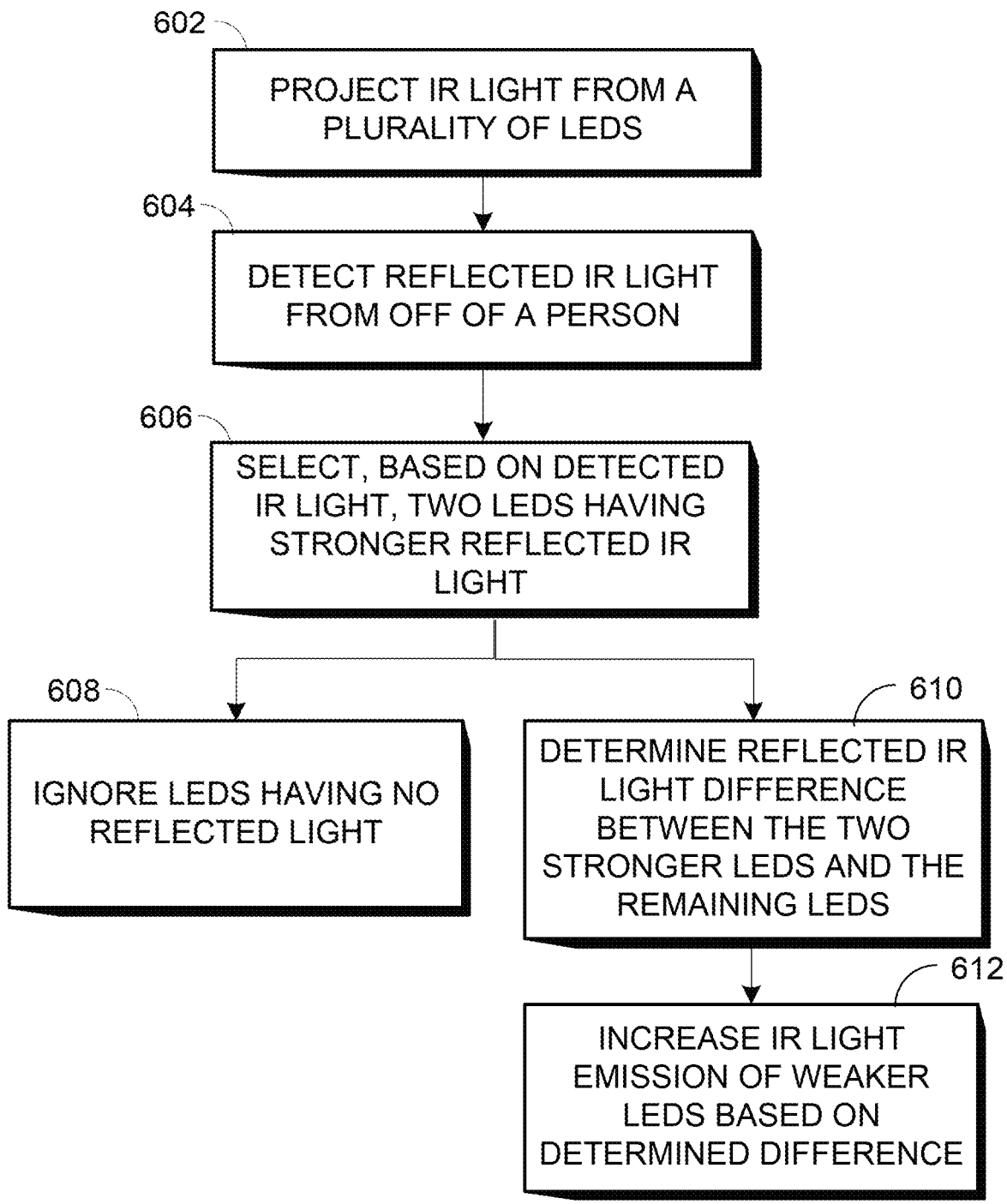

Referring to FIG. 6, a procedure 600 is carried out by the electronic device 100. At step 602, the electronic device 100 projects IR light from the LEDs. At step 604, the sensor 130 of the device 100 detects IR light originating from at least one of the LEDs reflected from off of a person. At step 606, the device 100 selects, based on the detected IR light, two LEDs having the stronger reflected IR light. At step 608, the device 100 may ignore the LEDs having no reflected light.

At step 610, the device 100 may determine, based on the detected IR light, a difference between the detected IR light from the two selected LEDs having the stronger reflected IR light and the remaining LEDs having the weaker reflected IR light. Based on the determined difference, at step 612, the device may increase the IR light projection of the remaining LEDs having the weaker reflected IR light.

Figure 7:
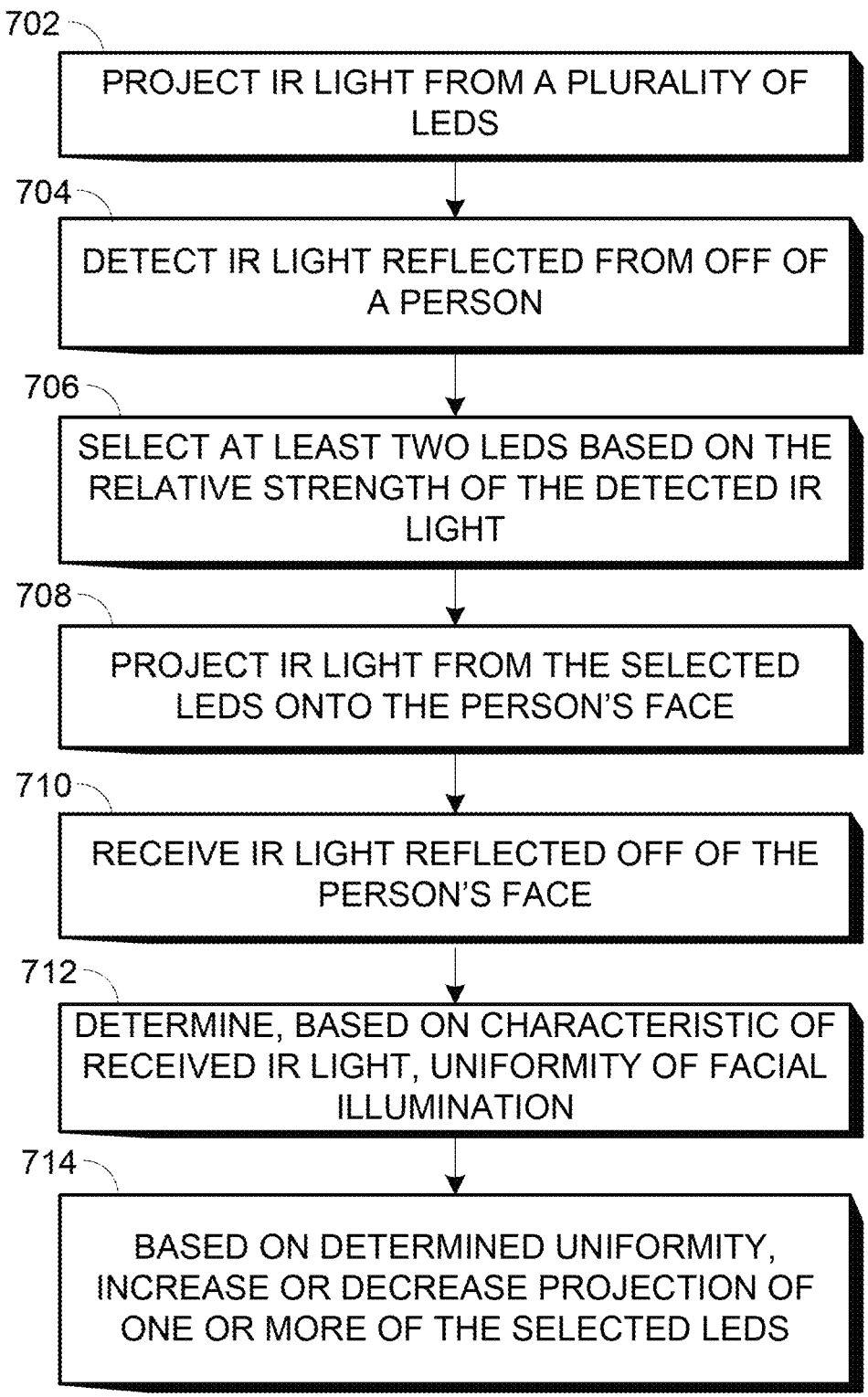

Referring to FIG. 7, a procedure 700 is carried out by the electronic device 100. Procedure 700 is directed to a facial and/or object illumination function using the IR LED system. Image recognition function is highly impacted by facial and/or object illumination. Without adequate illumination, image recognition failures are prevalent. Following the steps set forth in procedure 700, the electronic device 100 may create a uniform broad illumination of a person's face. Furthermore, when combined with procedure 500 (i.e., repeated selection of LEDs having the stronger reflected IR light), the device 100 may be further optimized to drive LEDs to compensate for poor user-to-device orientations.

In more detail, at step 702, the electronic device 100 projects IR light the LEDs. At step 704, the sensor 130 of the device 100 detects IR light reflected from off of a person. At step 706, the device 100 selects, based on the relative strength of the detected IR light, at least two of the LEDs (e.g., LEDs having the stronger reflected IR light). In another embodiment, the device 100 may select one LED, e.g., the LED with the strongest reflected IR light, and use the selected LED to illuminate the person's face.

Next, at step 708, the device 100 projects IR light from the selected LEDs onto the person's face. The sensor 130 of the device receives IR light reflected off of the person's face at step 710. Based on a characteristic of the received IR light, the device 100 determines the uniformity of the facial illumination at step 712. Then at step 714, based on the determined uniformity, the device 100 increases or decreases the projection of one or both of the two selected LEDs.

In an embodiment, the characteristic of the received IR light may include the relative strength of the received IR light from the LEDs. Based on the relative strength of the received IR light, the device 100 may further determine a difference between the received IR light from at least one LED having the stronger reflected IR light and at least one LED having the weaker reflected IR light. Based on the determined difference, the device 100 may increase the IR light projection of the LED or LEDs having the weaker reflected IR light. This embodiment is directed to an IR transceiver (LED and sensor) closed loop system, which may be used to enhance the facial illumination function as shown in procedure 700. The IR transceiver closed loop system adaptively adjusts the LEDs' IR light projections and coverage based on the received IR light signal to provide a more uniform illumination of the person's face.

Figure 8:
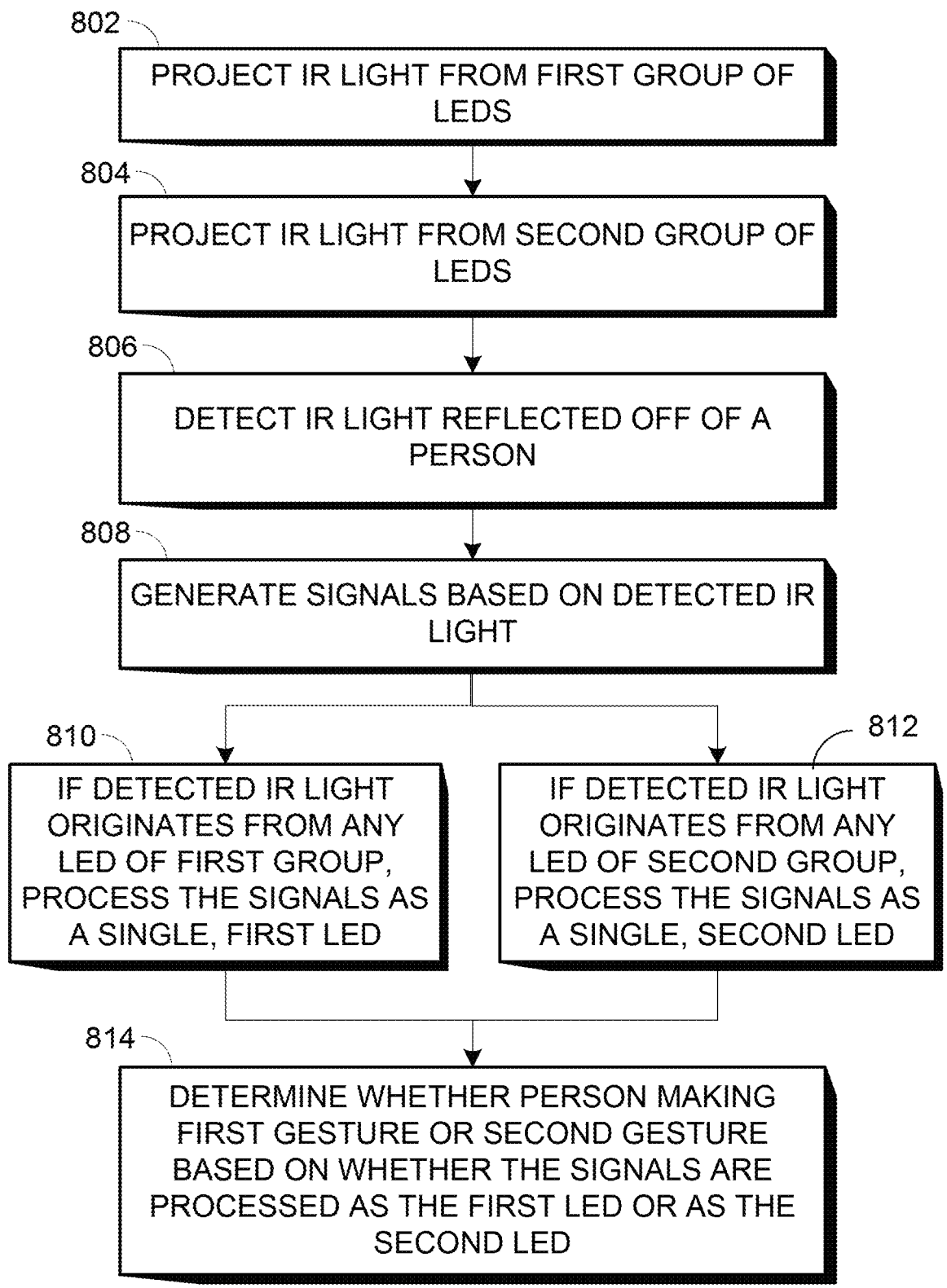

Referring to FIG. 8, a procedure 800 is carried out by the electronic device 100. Procedure 800 is directed to detecting gestures using IR LED groups. More specifically, in procedure 800, each group of LEDs functions as a single LED.

At step 802, the electronic device 100 projects IR light from a first group of LEDs. At step 804, the device 100 projects IR light from a second group of LEDs. The sensor 130 of the device 100 then detects IR light reflected off of a person at step 806. The device 100 then generates signals based on the detected IR light at step 808.

At step 810, if the device 100 determines that the detected IR light originates from any of the LEDs of the first group, the device 100 processes the signals as a single, first LED. At step 812, if the device 100 determines that the detected IR light originates from any of the LEDs of the second group, the device 100 processes the signals as a single, second LED. At step 814, based on whether the signals are processed as the first LED or the second LED, the device 100 determines whether the person is making a first gesture or a second gesture.

Figure 9:
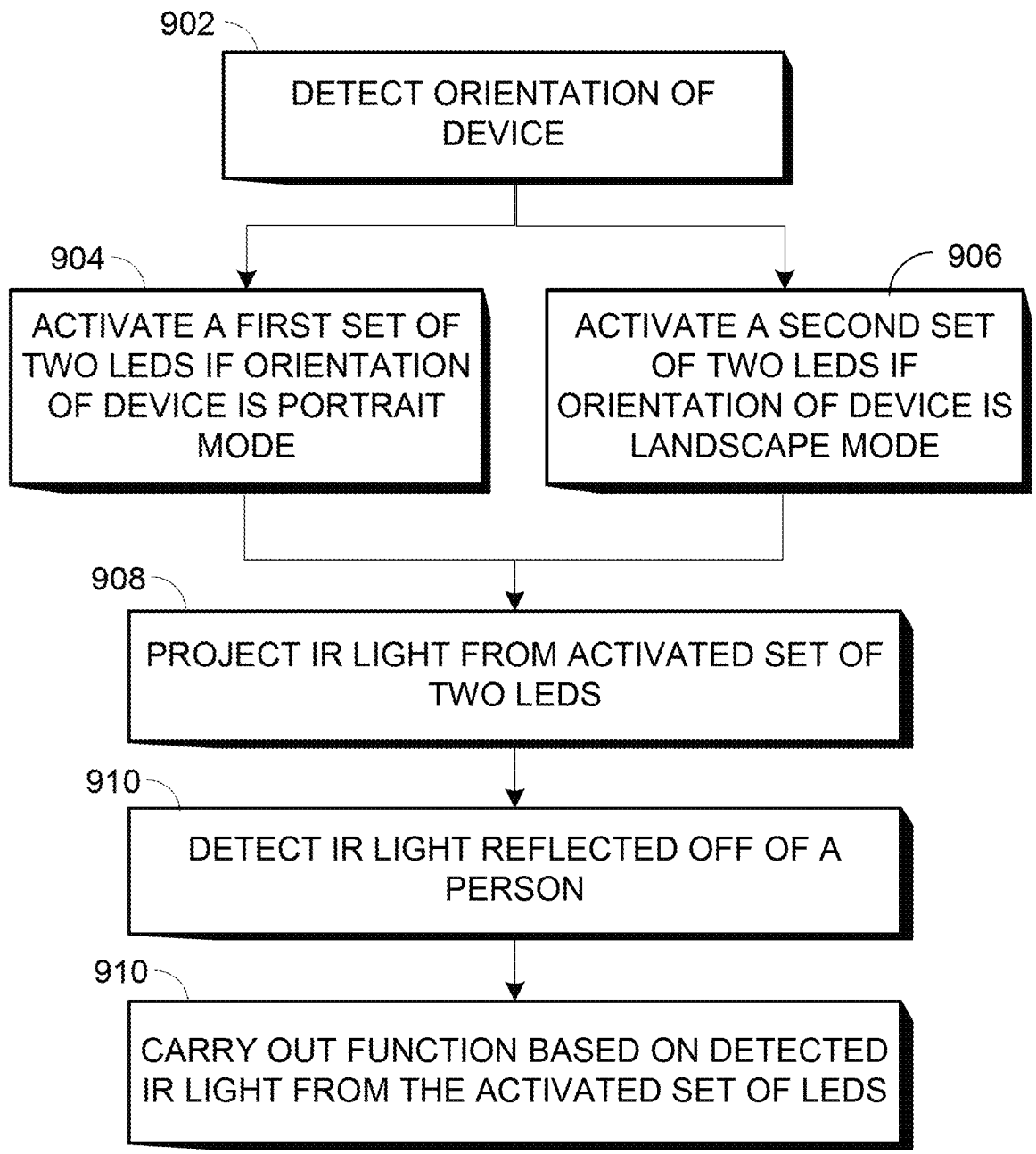

Referring to FIG. 9, a procedure 900 is carried out by the electronic device 100. Procedure 900 is also directed to detecting gestures using IR LED groups. Unlike procedure 800, however, the LED groups in procedure 900 functions as independent gesture detection systems.

At step 902, the electronic device 100 detects its orientation. At step 904, if the orientation of the device 100 is detected to be a portrait mode, the device 100 activates a first set of two LEDs. At step 906, if the orientation of the device is detected to be a landscape mode, the device 100 then activates a second set of two LEDs.

After activation, at step 908, the device projects light from either the first set of LEDs or the second set of LEDs. At step 910, the sensor 130 of the device 100 detects reflected IR light originating from at least one of the two activated LEDs reflected off of a person. Based on the detected IR light, at step 912, the device 100 carries out a function based on the detected reflected IR light from the activated set of LEDs.

In another embodiment, after activation and based on the detected orientation, the device may treat each set of LEDs as a single LED. For example, if the orientation of the electronic device 100 is detected to be a portrait mode, both LEDs in the first set of two LEDs may simultaneously project IR light. If the orientation of the electronic device 100 is detected to be a landscape mode, both LEDs in the second set of two LEDs may simultaneously project IR light.

Figure 10:
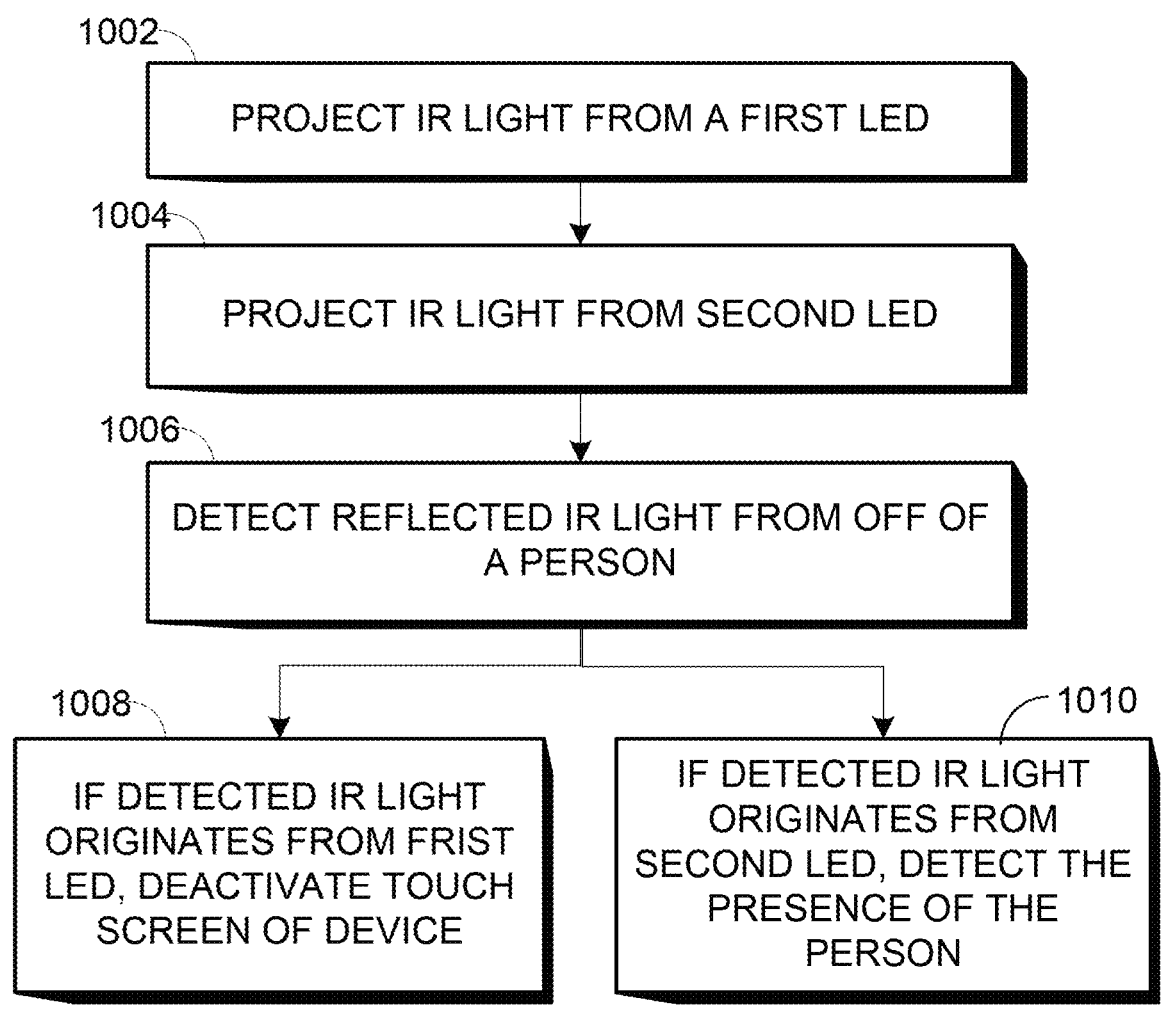

Referring to FIG. 10, a procedure 1000 is carried out by the electronic device 100. Procedure 1000 is directed to an IR proximity function. The IR proximity systems of conventional devices have a short range (about an inch) to eliminate the possibility of unintended false detection when an object or person comes near the devices. The short range may be problematic as a user sometimes moves the device toward his or her face in an odd orientation resulting in unintended actuation of the touch screen (proximity detection failure) before his or her face is detected.

In an embodiment, to perform the IR proximity function, two LEDs from the IR LED gesture detection system are used. The two LEDs should include the LED that is disposed closest to the sensor. For example, in the device 100 shown in FIG. 1, the first LED 120, which is disposed closest to the sensor 130, should be utilized for performing the IR proximity function. The other LED may be the second LED 122 or the fourth LED 126, which are disposed closer to the first LED 120 than the third LED 124.

The spacing between the first LED 120 and the sensor 130 may vary based on the distance between the cover glass of the housing 110 and the first LED 120, the distance between the cover glass of the housing 110 and the sensor 130, the projection area of the first LED 120, and the reception area of the sensor 130. To detect the presence of an object or a person at a close range (e.g., down to touching the cover glass such as the case when the person is conducting a phone call), the projection area of the first LED 120 and the reception area of the sensor 130 should intersect at or below the cover glass of the housing 110. Accordingly, if the first LED 120 has a large projection area or if the sensor 130 has a large reception area, the first LED 120 or the sensor 130 may be disposed closer to the cover glass of the housing 110.

In one embodiment, the sensor 130 of the IR LED gesture detection system is located in an area where the sensor 130 may detect a person's face touching the device 100 (e.g., near the speaker opening 112 of the top surface of the housing 110). If the sensor 130 is disposed at the bottom or sides of the device 100, the IR LED gesture detection system will still detect IR proximity, but the IR proximity detection function may be falsely triggered by the user's hand carrying device 100 or dialing the device 100, etc.

In addition, using two IR LEDs provides a voting ability of face presence detection that a single LED cannot. For instance, during a phone call, the first LED 120 and the second LED 122 may be used for performing the IR proximity function. The first LED 120 and the second LED 122 are cycled in time (e.g., TDMA). If reflected IR light from either of the first LED 120 and the second LED 122 is detected by the sensor 130, the device 100 determines that a face is present and may deactivate the touch screen. However, because the second LED 122 is farther away from the sensor 130 than the first LED 120, the second LED 124 is used to detect a person's approach before the person touches the cover glass of the housing 110 and supplements the first LED 120, which can detect both approach and touch (intercept point design). In other embodiments, the first and second LEDs may be disposed right next to sensor (e.g., on either side of the sensor), and both LEDs may detect both approach and touch.

Referring to FIG. 10, at step 1002, the electronic device 100 projects IR light from a first LED (i.e., the first LED 120). At step 1004, the device 100 projects IR light from a second LED (e.g., the second LED 122 or the fourth LED 126). At step 1006, the sensor 130 of the device 100 detects reflected IR light from off of a person. In the present embodiment, the sensor 130 is disposed closer to the first LED than the second LED (e.g., the sensor 130 is disposed closest to the first LED 120).

The device 100 may use the two LEDs in procedure 1000 to carry out a voting function based on whether the detected IR light originates from the first LED or the second LED. Based on the result of the voting function, the device 100 may determine whether to deactivate the touch screen. To carry out the voting function, one of the two LEDs may have a longer projection range than the other of the two selected LEDs, or one of the two LEDs may be disposed closer to the sensor 130 than the other. In such an embodiment, the device 100 will only deactivate the touch screen if the detected IR light originates from the first LED, and will carry out another function if the detected IR light originates from the second LED. For instance, at step 1008, if the detected IR light originates from the first LED, the device 100 deactivates a touch screen of the device 100. At step 1010, if the device 100 determines that the detected IR light originates from the second LED (which is disposed farther from the sensor 130 than the first LED), the device 100 may detects the presence of the person and may perform a notification function indicating that a person is present or approaching the device 100.

Figure 11:
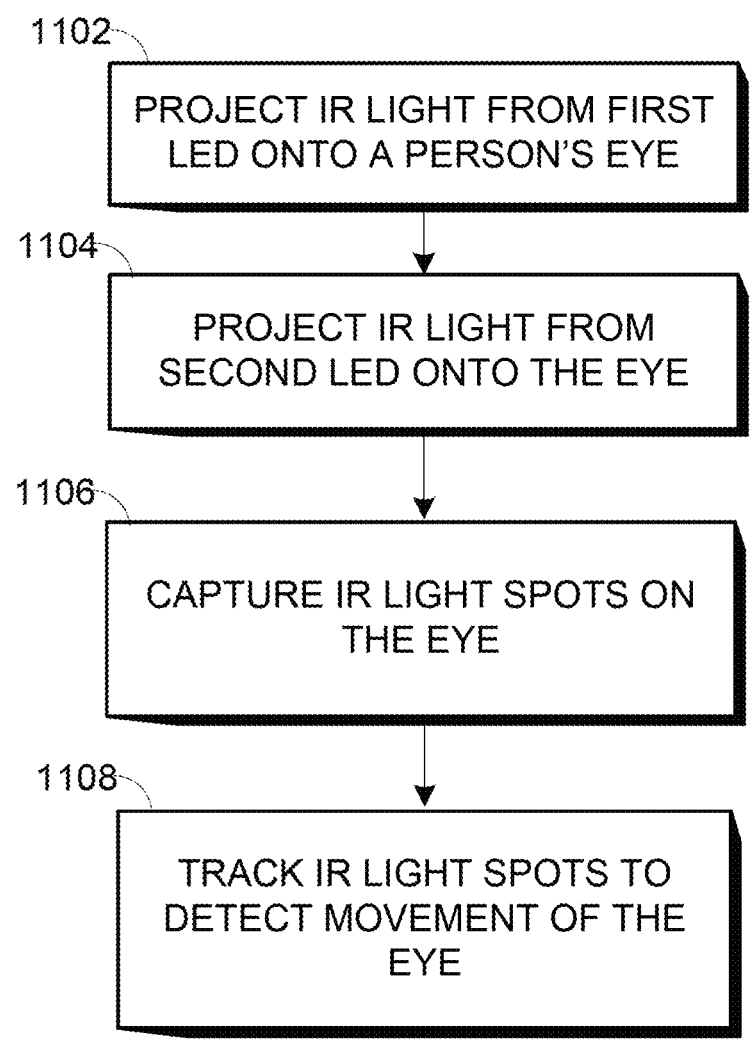

Referring to FIG. 11, a procedure 1100 is carried out by the electronic device 100. Procedure 1100 is directed to an eye movement tracking function. During eye movement tracking, two LEDs from the IR LED gesture system are selected to project IR light onto a person's eye pupil. Projected IR light spots will appear on the eye. The device 100 then captures the IR light spots on the eye using a front facing camera of the device. For effective eye movement tracking, multiple LEDs are needed for depth detection. Furthermore, these LEDs should be disposed apart in order to appear as separate sources of IR light (e.g., about 2.5 inches of separation between the LEDs may be preferred).

Referring to FIG. 11, at step 1102, the electronic device 100 projects IR light from a first LED onto a person's eye. At step 1104, the device 100 projects IR light from a second LED. Then at step 1106, the camera of the device 100 captures IR light spots on the person's eye from the first LED and the second LED. The device 100 tracks the IR light spots to detect movement of the eye in step 1108.

The device 100 may further determine a characteristic of the captured IR light spots. The characteristic of the captured IR light spots may include the strength of the captured IR light spots. The characteristic may also include the angle at which the captured IR light spots is received. The characteristic may further include the direction from which the captured IR light spots is received. Using the determined characteristic, the IR LED detection system may dynamically adapt to any changes in the orientation or direction of the person's head or eyes.

In an embodiment, before performing procedure 1100, the device 100 may determine which group of two LEDs of the plurality of LEDs is the most appropriate for tracking movement of the eye. In the IR LED gesture detection system described above, the device 100 may select and adaptively switch to the most suitable LEDs for tracking movement of the eye based on a user's looking direction. The user's looking direction relative to device 100 may be using the procedure 400 directed to IR LED selection. Thus, this IR LED selection for eye movement tracking is similar to the selection and reselection of LEDs described with respect to FIGS. 4 and 5. In this case, a camera of the device 100 may be used instead of the sensor 130.

Furthermore, as discussed in with respect to FIG. 5, the reflected IR light from the selected LEDs is continuously monitored. This procedure may also be adapted to the eye movement tracking function. When the reflected IR light from a selected LED is weak, the device 100 may energize the weak LED for better eye movement tracking based on the face or object location relative to the device 100. In other words, the device 100 may identify an LED of the plurality of LEDs that is weaker than the remaining LEDs, and the device 100 may then energize the identified LED. Accordingly, the IR LED gesture detection system helps to improve eye movement tracking via a continuous feedback loop. The IR LED gesture detection system may also be used to overcome background interference.

Figure 12:
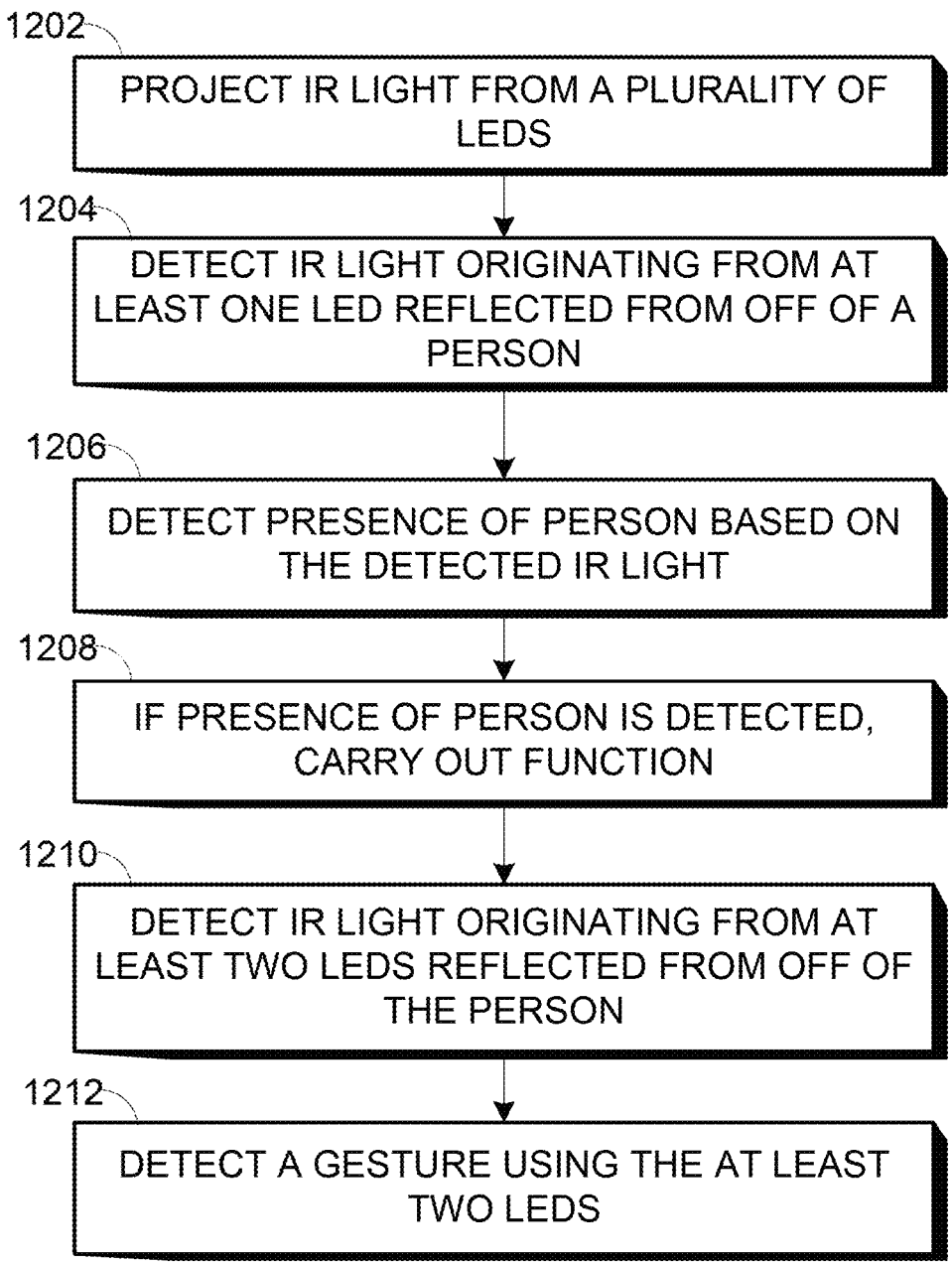

Referring to FIG. 12, a procedure 1200 is carried out by the electronic device 100. Procedure 1200 is directed to cycling the plurality of LEDs to detect the approach or presence of a person and detect a gesture. First the device 100 detects whether the person is present or approaching the device 100. At step 1202, the LEDs project IR light. The sensor 130 detects IR light originating from at least one of the LEDs reflected from off of the person at step 1204. Based on the detected IR light, the device 100 detects the presence of the person at step 1206. Then at step 1208, if the presence of the person is detected (e.g., the person is approaching the device 100), the device 100 carries out a function. The device 100 may turn on a screen, wake up the device 100, display the time, initiate a notification, change a user interface, perform power optimization to turn the device 100 on or off, or reduce the power consumption of the device 100.

Once the device 100 has detected the approach or presence of the person, the device 100 detects a gesture of the person, who may be dismissing a notification or may be instructing the device 100 to person another function. At step 1210, the sensor 130 detects IR light originating from LEDs reflected from off of the person. Then at step 1212, the device 100 detects the gesture of the person using the light of the LEDs.

For both person/object detection and gesture detection, the plurality of LEDs may project IR light sequentially. In other embodiments, to increase the detection range or coverage, the plurality of LEDs may project IR light simultaneously (e.g., when the device 100 performs the enhanced hand approach detection discussed above).

In addition to the exemplary functions described above, the IR LED gesture detection system may be adapted for carrying out other functions. For instance, the presence of four LEDs is highly beneficial to reliable IR transmission. When all LEDs projects IR light simultaneously, a super transmitter is achieved with longer range and broader coverage. Thus, when some LEDs are obstructed by user's hand, barcode data can still be transmitted using the unobstructed LED.

It can be seen from the foregoing that an electronic device with an IR LED gesture detection system and methods for using the gesture detection system have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method in an electronic device, the method comprising:
   detecting, using a sensor, light originating from at least two light sources of a plurality of light sources that is reflected from a feature of a user of the electronic device;
   generating at least one signal based on a plurality of determined characteristics of the detected light;
   determining movement of the feature of the user based on the at least one signal; and
   carrying out a function on the electronic device based on the at least one signal.

2. The method of claim 1, wherein the carrying out a function on the electronic device comprises carrying out a function on the electronic device based on relative strength of the detected light originating from the at least two light sources.

3. The method of claim 2, further comprising reselecting at least one light source of the plurality of light sources if the detected light originating from at least one of the at least two light sources becomes weaker than detected light originating from the at least one light source.

4. The method of claim 2, further comprising:
   determining, based on the relative strength of the detected light, a difference between detected light originating from at least one light source of the at least two light sources having a stronger detected light and detected light originating from at least one light source of the at least two light sources having a weaker detected light; and
   causing an increased amount of light to be projected from the at least one light source from which the weaker detected light originated based on the determined difference.

5. The method of claim 1, wherein the plurality of determined characteristics includes a strength of the detected light.

6. The method of claim 1, wherein the plurality of determined characteristics includes an angle at which the detected light is detected.

7. The method of claim 1, wherein the plurality of determined characteristics includes a direction from which the detected light is detected.

8. The method of claim 7, further comprising reselecting at least one light source of the plurality of light sources based on the at least one signal indicating the direction from which the detected light is detected.

9. The method of claim 1, wherein the plurality of light sources is disposed proximate to the perimeter of the electronic device.

10. The method of claim 1, wherein the sensor is a front facing camera of the electronic device.

11. An electronic device comprising:
    a plurality of light sources;
    a sensor for detecting light originating from one or more of the plurality of light sources; and
    a hardware processor that is configured to:
       detect, using the sensor, light originating from at least two light sources of a plurality of light sources that is reflected from a feature of a user of the electronic device;
       generate at least one signal based on a plurality of determined characteristics of the detected light;
       determine movement of the feature of the user based on the at least one signal; and
       carry out a function on the electronic device based on the at least one signal.

12. The device of claim 11, wherein the hardware processor is further configured to: carry out a function on the electronic device based on relative strength of the detected light originating from the at least two light sources.

13. The device of claim 12, wherein the hardware processor is further configured to reselect at least one light source of the plurality of light sources if the detected light originating from at least one of the at least two light sources becomes weaker than detected light originating from the at least one light source.

14. The device of claim 12, wherein the hardware processor is further configured to:
    determine, based on the relative strength of the detected light, a difference between detected light originating from at least one light source of the at least two light sources having a stronger detected light and detected light originating from at least one light source of the at least two light sources having a weaker detected light; and cause an increased amount of light to be projected from the at least one light source from which the weaker detected light originated based on the determined difference.

15. The device of claim 11, wherein the plurality of determined characteristics includes at least one signal comprises at least one signal indicating a strength of the detected light.

16. The device of claim 11, wherein the plurality of determined characteristics includes at least one signal comprises at least one signal indicating an angle at which the detected light is detected.

17. The device of claim 11, wherein the plurality of determined characteristics includes at least one signal comprises at least one signal indicating a direction from which the detected light is detected.

18. The device of claim 17, wherein the hardware processor is further configured to reselecting at least one light source of the plurality of light sources based on the at least one signal indicating the direction from which the detected light is detected.

19. The device of claim 11, wherein the plurality of light sources is disposed proximate to the perimeter of the electronic device.

20. The device of claim 11, wherein the sensor is a front facing camera of the electronic device.

21. A non-transitory computer-readable medium containing computer executable instructions that, when executed by a processor, cause the processor to perform a method in an electronic device, the method comprising:

detecting, using a sensor, light originating from at least two light sources of a plurality of light sources that is reflected from a feature of a user of the electronic device;

generating at least one signal based on a plurality of determined characteristics of the detected light;

determining movement of the feature of the user based on the at least one signal; and carrying out a function on the electronic device based on the at least one signal.

* * * * *